Harvey C. Young
Pius Geiger
INVENTORS

Aug. 18, 1970  H. C. YOUNG ET AL  3,524,571
COMPACT BELT SUPPORTED TACKLE AND BAIT KIT
Filed April 18, 1968  2 Sheets-Sheet 2
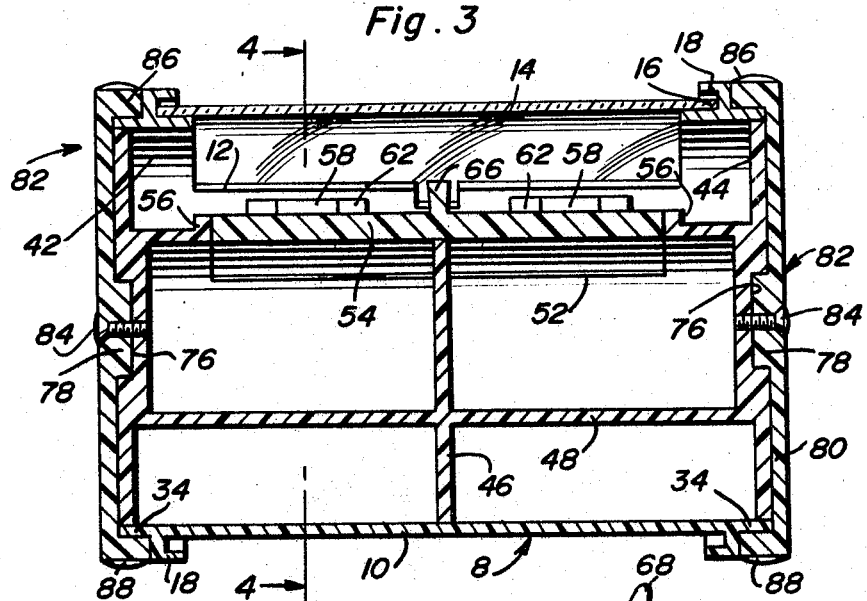
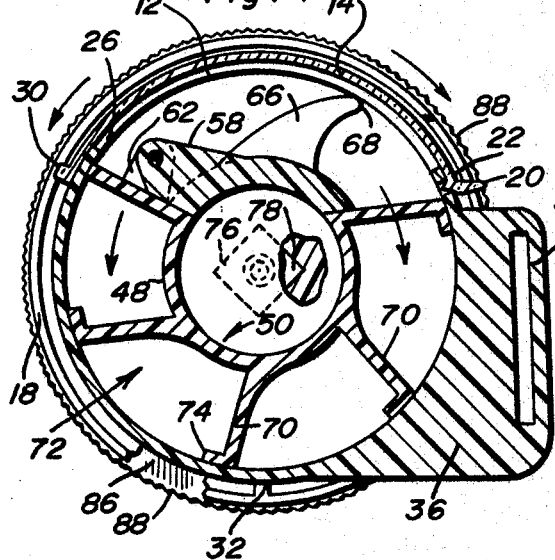
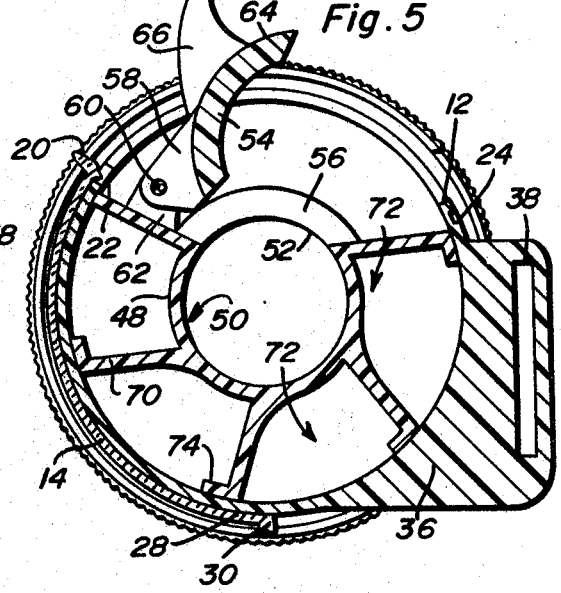
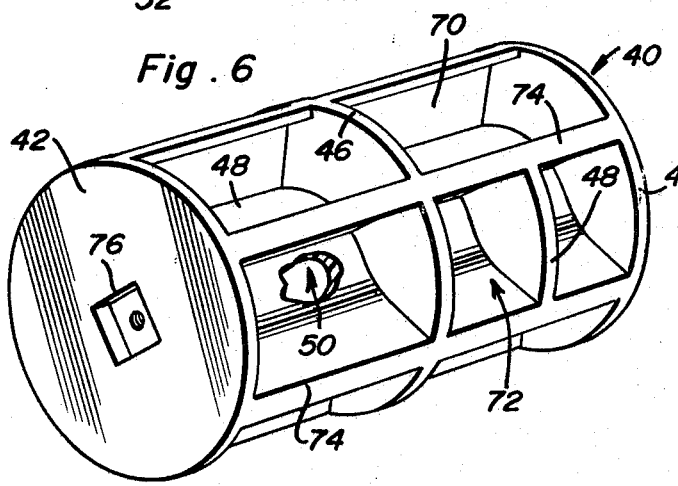
Harvey C. Young
Pius Geiger
INVENTORS.
BY Clarence A. O'Brien
and Harvey B. Jacobson
Attorneys United States Patent Office
3,524,571
Patented Aug. 18, 1970

1

3,524,571
COMPACT BELT SUPPORTED TACKLE AND BAIT KIT
Harvey C. Young, 2415 41st St. W. 59102, and Pius Geiger, 41 Nimitz Drive 59101, both of Billings, Mont.
Filed Apr. 18, 1968, Ser. No. 722,419
Int. Cl. A01k 97/04
U.S. Cl. 224—5      5 Claims

ABSTRACT OF THE DISCLOSURE

A compact belt supported kit is provided for an angler when he desires to leave camp for a short trip up or down a stream or the shoreline. It enables him to store lures, split shot, swivels and small sinkers. It comprises a lid-equipped outer plastic sleeve which encloses or houses an inner compartmental drum. The drum has milled mounting end caps journalled for rotation on the ends of the sleeve. Built-in partitions divide the drum into selectively usable compartments. A live bait "can" in the drum has a closable cover. The sleeve has a hand hole and shiftable lid to permit access to be had to the drum. Other features will be hereinafter set forth.

---

The present invention relates to certain new and useful improvements in a compact and convenient multipurpose angler's kit which is expressly designed and adapted for attachment to and temporary retention on the angler's trousers belt and which is characterized, generally construed, by inner and outer complemental units, more particularly, an outer sleeve which is designed and adapted to house and enclose an inner compartmental drum.

This innovation, while small and compact in size, has the necessary space for the equipment that the fisherman needs when he is going up the creek or from his main camp to a nearby creek. He will be able to take along lures, split shot, swivels and small sinkers. The built in bait can will hold worms and other types of live bait. Because of the construction shown and pocket-like lure cells or compartments provide dead air space and thus give the bait can an insulative function. The void between the bait can lid and the outer lid can be used to confine grasshoppers and other types of live bait other than worms. The view through lid allows the fisherman to see what he is trying to catch within the unit. The beak-like bait can handle is unique in that it doubles as a pressure responsive retainer and keeps the dirt-tight lid closed when a complete revolution of the drum is made. The bait can is used primarily for worms. The journals at the respective outer ends of the sleeve can be lubricated with any type of all purpose oil. Because of the small tolerances (1/64 inch) this unit will need regular cleaning. This can be achieved by immersing it in water with the outer lid open. It will soon fill with water and with several revolutions most of the debris that would collect should come out and sink to the bottom. It can then be wiped dry with an adsorbent cloth.

Using contrasting colors makes it easy to spot when dropped in water or grass. It also has some buoyant qualities, but does not last for too long a time, especially when loaded to capacity.

Briefly the preferred embodiment of this novel self-contained holder and carrier is characterized by an outer unit embodying an elongate sleeve which is open at its respective ends. This sleeve, which may be made from a suitable grade of plastic material, provides a housing which is preferably cylindrical in cross-section and is provided in a peripheral surface thereof with an elongate slot which provides a feasible hand hole. Means is provided on the periphery to accommodate and retain a manually actuatable lid. This lid normally covers the hand hole. A second or companion inner unit is orientated and cooperable with requisite nicety with the outer enclosing unit. The inner unit comprises a molded plastic or an equivalent drum and the latter is encased within the encompassing confines of the sleeve. This drum, broadly speaking, has internal partitions or dividers which coact in providing a plurality of compartments for temporary storage of selectively available bait and small articles of tackle as already set forth. The drum is mounted for rotation in the sleeve and is turnable and adjustable in a manner so that a selected compartment can be lined up with the hand hole for accessibility, that is, when said lid has been moved to an open position. The central or axial portion of the drum is provided with a hollow built-in chamber which serves as a container for readily insertable and removable live bait, usually worms. A peripheral portion of the wall of the chamber has an entrance opening which is normally closed by a hingedly mounted cover. The cover has a novel lateral projection providing a handle for opening the cover and also for holding the cover tightly closed in the manner already set forth.

It will be noted too that the end heads of the rotary compartmented drum are provided with caps which are screwed or otherwise keyed in place. The rim portions of the caps are turnable on journal-like ends of the sleeve so that either cap can be caught hold of to rotate the drum in either direction for desired use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a longitudinal central sectional view taken approximately on the plane of the section line 3—3 of FIG. 2 looking in the direction of the arrows.

FIG. 4 is a cross-section on the plane of the section line 4—4 of FIG. 3 with the sliding lid closed and also the drum a compartment covered or closed.

FIG. 5 is a view similar to FIG. 4 but showing the lid slid from right to left open position and also showing the cover of the live bait container swung to open position for accessibility.

FIG. 6 is a view in perspective of the inner unit herein referred to as the compartmental drum.

Figure 7:
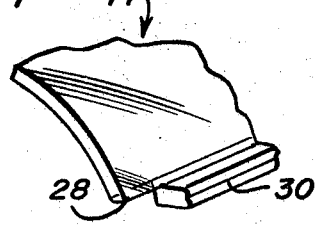

And FIG. 7 is a fragmentary perspective view of a corner portion of the openable and closable lid.

Figure 1:
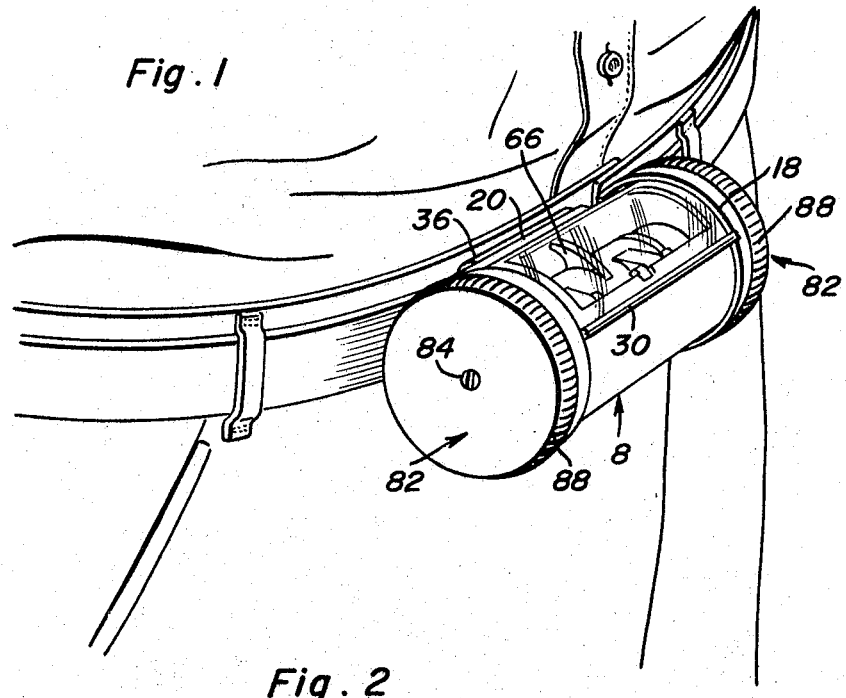
FIG. 1 is a view in perspective showing the ready-to-use multipurpose angler's kit constructed in accordance with the invention and suggesting its preferred manner of use.
Figure 2:
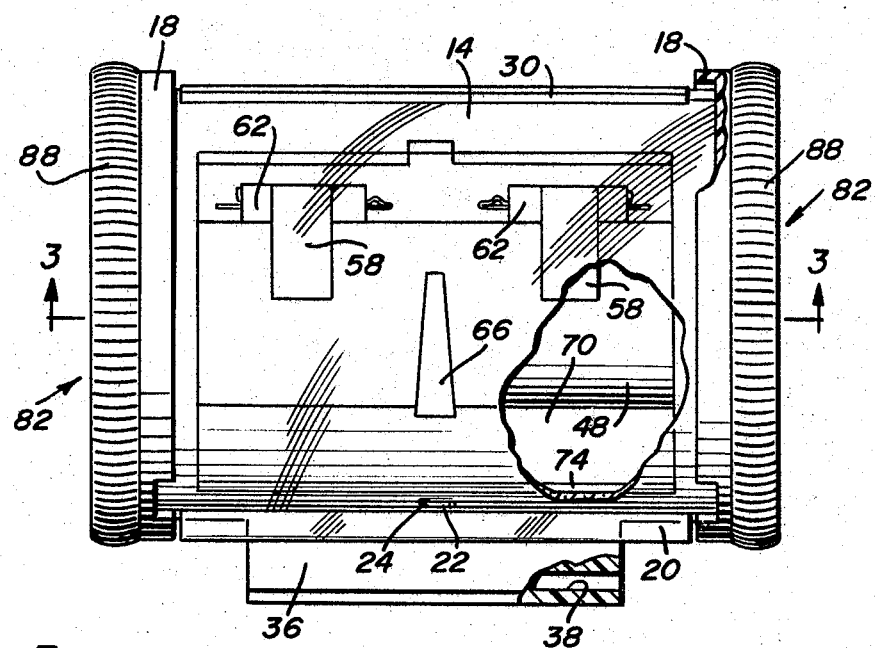
FIG. 2 is an enlarged view with portions broken away to more clearly bring out some of the component parts.

With reference now to the aforementioned outer drum housing unit this is denoted by the numeral 8 (FIG. 3). It is characterized by an open-ended cylindrical sleeve the body portion of which is denoted generally by the numeral 10. As also shown in FIG. 3 the body portion is provided with an elongated rectangular slot 12. This slot 12 is normally closed by a substantially rectangular arcuately shaped plastic panel which is more specifically referred to as an openable and closeable lid 14. The respective end portion 16 of this lid are slidingly or shiftably mounted in grooved flanges 18 which are attached to and encircle the end portions of the sleeve. These grooved flanges provide annular tracks and lid 14 can be slid from the closed position shown in FIG. 4 to the open position shown in FIG. 5. To assist in accomplishing this result it will be noted that the right hand longitudinal edge portion of the lid is provided with a suitable lip 20 which provides an appropriate finger grip. This end portion is also provided with a relatively small detent 22 (FIGS. 4 and 5) which is capable of being snapped into a keeper seat 24 which is provided therefor along one edge of the sight opening 12. When the lid is shifted to open position this detent drops into a clearance opening 26 provided therefor and which is also best shown in FIGS. 4 and 5. The other longitudinal edge portion 28 of the lid is provided with a reinforcing flange 30 which constitutes a rib and also serves as a return finger grip. Thus with these two grips the lid can be slid from open to closed position and back again. It will be further noted in FIG. 4 that the numeral 32 designates a limit stop which is mounted if desired in the tracking groove. It will also be noted that the projecting end portions 34, that is the ends which project beyond the annular tracks 18 constitute journals which serve in a manner to be hereinafter set forth. With further reference to FIGS. 4 and 5 it will be noted that the peripheral portion of the sleeve is provided with a radially projecting lug 36 which has a slot 38 extending therethrough. This slotted lug serves to provide a passage for the body encircling belt of the user in the manner aptly illustrated, it is believed, in FIG. 1.

Taking up now the second unit, that is the inner one, this unit is denoted generally speaking in FIG. 6 by the numeral 40 and it is of a molded plastic one-piece type and is proportioned so that is it fittingly usable within the hollow portion of the encompassing or housing sleeve 8. This unit is specifically described as a rotary compartmental drum and as shown in FIG. 6 it comprises a disk-like head 42 at the left, a similar disk-like head 44 at the right, an intermediate disk-like partiton 46 and a segmental auxliary partition 48. The central or axial portion of the drum is provided with a longitudinal hollow member 49 the hollow portion of which provides a container as at 50. This feature is also referred to as a live bait storing and transporting can. It is provided on one side with an entrance opening 52 which is normally closed by a segmental cover 54. The cover is of the approximate dimension shown and closes between the outstanding guide flanges 56. This cover is provided with attaching lugs 58 which are hingedly mounted at 60 between suitable ears 62. The exterior surface 64 of the cover is provided with a beak-like handle 66 having a rounded bill portion 68 which has wiping contact with the interior of the aforementoned housing or sleeve when the drum is rotated through an approximate 360° revolution (not detailed). The handle facilitates opening and closing the cover and also maintaining the cover tightly closed in a manner previously set forth. In addition to the live bait container or can it will be seen that radial webs are provided as at 70 and these are circumferentially spaced and cooperate with the aforementioned heads and dividers 42, 44, 46 and 48 to thus provide a plurality of individual small article or tackle compartments all of which are conveniently denoted at 72. It will be further noted that the radial webs are provided at their outer ends with lateral end portions 74 which reinforce the webs and also have wiping or rotating contact with the coacting interior surfaces of the sleeve. It will be further noted that the end heads 44 are provided with axially disposed recesses 76 to accommodate correspondingly shaped projections 78 on interior surfaces of the disk-like portions 80 of the respective mounting caps 82. These caps are fastened in place by screw-threaded headed fasteners as at 84. The rim portion 86 of each cap is rotatable on the cooperating journal 34. The gripping surfaces of the rim portions are milled or otherwise knurled as at 88 to facilitate gripping either cap and rotating the drum.

By mounting the device on the belt in the manner shown the user can grip either cap 82 and rotate it either left or right. This can be done in a manner to bring the component portions of the drum into a viewable position. The fact that the aforementioned lid 14 is of clear transparent plastic material it will be evident that the user can position the drum wherever desired at will. Assuming that the parts are in the position shown in FIGS. 4 and 5 it will be evident that by catching hold of the lip 20 the lid 14 can be slid from right to left to assume the out-of-the-way or open position shown at the right in FIG. 5. This will then make the cover 54 accessible and by catching hold of the handle 66 the cover can be opened to obtain access to the live bait chamber or container 50. Manifestly this is just one of the positions of the drum and by closing the cover and rotating the drum a step further to the right or left any one of the desired compartments or pockets 72 can be brought into position to permit access to be had to the contents thereof.

It is submitted that the construction and cooperative arrangement of the inner and outer units and coacting parts will be clear from the views of the drawing taken in conjunction with the detailed description of the parts. It is also believed that this simple, practical and compact selector type holder and carrier well serves the purposes for which it has been perfected. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-contained holder and carrier for bait and tackle comprising, in combination, an outer unit embodying an elongate sleeve which is open at its respective ends, said sleeve providing a housing and having an elongate slot in its peripheral surface providing a hand hole, a manually actuatable lid normally covering said hand hole, a companion inner unit complemental to said outer unit, said inner unit comprising a drum encased within the encompassing confines of said sleeve, said drum having internal dividers orientated and providing multipurpose compartments for selectively available bait and small articles of tackle, said drum being mounted for rotation in said sleeve and adjustable in a manner so that a selected compartment can be lined up with said hand hole for accessibility, that is, when said lid has been moved to an open position, said sleeve being cylindrical in transverse cross-section and is provided around its exterior peripheral surface with annular outstanding flanges, each flange having an endless groove, the respective grooves being opposed, facing each other and providing guide tracks, said lid having end portions slidably and guidingly shiftable in said tracks.

2. The holder and carrier defined in and according to claim 1, and wherein said lid comprises an arcuately bent transparent panel having a lengthwise lip along an inward longitudinal edge providing a first finger grip and a lengthwise reinforcing rib along its outward longitudinal edge and providing a second finger grip, said finger grips being usable to facilitate opening and closing said lid and said first finger grip having a detent releasably cooperable with a keeper seat provided therefor in a coacting edge portion of the peripheral surface of said sleeve.

3. The selector-type compact belt-supportable kit for stream or shoreline use comprising an elongate openended cylindrical sleeve providing a drum housing, a portion of the body of said sleeve having an elongate slot constituting a hand hole, said sleeve being provided inwardly of its respective ends with annular encircling flanges which are grooved and provide a pair of opposed endless guide tracks, an arcuate panel providing a lid and having its respective ends shiftable in their respectively cooperable tracks and normally covering and closing said hand hole, said sleeve having an outstanding lug with a belt slot and adapted to be hung on the user's trousers belt, a companion inner unit complemental to said outer unit, said inner unit comprising a drum encased within the encompassing confines of said sleeve, said drum having internal dividers orientated and providing multi-purpose compartments for selectively available bait and small articles of tackle, said drum being mounted for rotation in said sleeve and adjustable in a manner so that a selected compartment can be lined up with said hand hole for accessibility, that is, when said lid has been moved to an open position.

4. The kit defined in and according to claim 3, and wherein said drum is provided at its respective ends with sleeve-end closing caps, said caps being journalled for free rotation on the cooperating end portions of said sleeve and having milled marginal flanges providing drum turning grips, said drum having a hollow axially disposed chamber providing a can-like container having an elongated entrance-exit slot affording access to the chamber portion, and a hingedly mounted cover normally covering and closing said entrance-exit slot.

5. The kit defined in and according to claim 4, and wherein said cover is provided with a lateral beak-like member which is accessible when said lid is open, said member constituting a cover opening and closing handle.

References Cited
UNITED STATES PATENTS

| | | | |
|---|---|---|---|
| 2,214,993 | 9/1940 | De Witt | 43—57.5 XR |
| 2,478,621 | 8/1949 | Attula. | |
| 2,503,490 | 4/1950 | Janz | 43—55 |

GERALD M. FORLENZA, Primary Examiner

U.S. Cl. X.R.

224—26; 220—20, 20.5